US011459980B2

(12) United States Patent
Kelford et al.

(10) Patent No.: US 11,459,980 B2
(45) Date of Patent: Oct. 4, 2022

(54) COMPRESSION RING FOR EXHAUST NOZZLE AND CENTER BODY ATTACHMENT

(71) Applicant: ROHR, INC., Chula Vista, CA (US)

(72) Inventors: Bryce Tyler Kelford, San Diego, CA (US); Adam Saunders, Chula Vista, CA (US); Richard Scott Alloway, San Diego, CA (US); Vijay V. Pujar, Rancho Santa Fe, CA (US)

(73) Assignee: Rohr, Inc., Chula Vista, CA (US)

( * ) Notice: Subject to any disclaimer, the term of this patent is extended or adjusted under 35 U.S.C. 154(b) by 261 days.

(21) Appl. No.: 16/700,636

(22) Filed: Dec. 2, 2019

(65) Prior Publication Data

US 2021/0164367 A1    Jun. 3, 2021

(51) Int. Cl.
| F02K 1/80 | (2006.01) |
| F01D 25/28 | (2006.01) |
| F02K 1/04 | (2006.01) |
| F01D 25/24 | (2006.01) |
| F01D 25/30 | (2006.01) |

(52) U.S. Cl.
CPC .............. *F02K 1/80* (2013.01); *F01D 25/243* (2013.01); *F01D 25/28* (2013.01); *F02K 1/04* (2013.01); *F01D 25/30* (2013.01); *F05D 2220/323* (2013.01); *F05D 2260/31* (2013.01)

(58) Field of Classification Search
CPC . F02K 1/80; F02K 1/04; F01D 25/243; F01D 25/28; F01D 25/30; F05D 2220/323; F05D 2260/31; F05D 2300/50212; F05D 2300/6033; Y02T 50/60
See application file for complete search history.

(56) References Cited

U.S. PATENT DOCUMENTS

| 4,907,743 | A | 3/1990 | Bouiller et al. |
| 5,833,435 | A | 11/1998 | Smith |
| 9,784,215 | B2 | 10/2017 | Lu et al. |
| 10,094,244 | B2 | 10/2018 | Fitzpatrick et al. |
| 10,316,792 | B2 | 6/2019 | Yousefiani et al. |
| 2010/0102144 | A1* | 4/2010 | Conete ............... F01D 25/243 29/525.01 |
| 2011/0203255 | A1 | 8/2011 | Conete |
| 2015/0083822 | A1 | 3/2015 | Mecuson et al. |
| 2015/0322890 | A1* | 11/2015 | Lu .................. B23P 15/008 60/770 |
| 2016/0115904 | A1 | 4/2016 | Sutterfield et al. |
| 2016/0131083 | A1 | 5/2016 | Lu et al. |

OTHER PUBLICATIONS

European Patent Office, European Search Report dated Apr. 26, 2021 in Application No. 20211353.6.

* cited by examiner

*Primary Examiner* — Gerald L Sung
*Assistant Examiner* — Rene D Ford
(74) *Attorney, Agent, or Firm* — Snell & Wilmer L.L.P.

(57) ABSTRACT

An attachment system for an exhaust component is disclosed. In various embodiments, the attachment system includes a radial attachment flange of the exhaust component; and a radial ring having at least one of a radially outer surface configured for engagement with a radially inner surface of the radial attachment flange or a radially inner surface configured for engagement with a radially outer surface of the radial attachment flange.

12 Claims, 7 Drawing Sheets

FIG.4

COMPRESSION RING FOR EXHAUST NOZZLE AND CENTER BODY ATTACHMENT

FIELD

The present disclosure relates generally to gas turbine engines and, more particularly, to apparatus and methods used to attach exhaust components for exhaust systems constructed of composite materials to gas turbine engines for aircraft.

BACKGROUND

Modern commercial aircraft employ gas turbine engines for propulsion. The exhaust systems used with such gas turbine engines typically include a center body surrounded by an annular nozzle to form an annular passageway downstream of a core engine surrounded by an exhaust system. A high-temperature core engine flow stream typically exits a downstream turbine stage of the core engine and is subsequently exhausted as a high-temperature exhaust stream from the core engine through the annular passageway.

The center bodies and the surrounding annular nozzles comprising such annular passageways are often subject to extreme heat of the high-temperature exhaust stream. Other components proximate the exhaust center body and the annular nozzle, such as, for example, a pylon fairing and an aft core cowl of a thrust reverser are also subject to the high temperature exhaust stream. In order to improve the overall fuel efficiency of aircraft engines, the maximum temperatures of exhaust streams continue to trend ever higher. Ceramic materials, ceramic matrix composite (CMC) materials and other similar materials exhibiting high temperature capabilities have been proposed for forming the various components of the exhaust systems and, in particular, the components of the exhaust system directly subject to the high-temperature exhaust streams, including the exhaust center bodies, the exhaust annular nozzles, the aft core cowl and the pylon fairings of such exhaust systems.

Various challenges arise when employing exhaust systems constructed from ceramic or CMC materials within the exhaust systems of gas turbine engines. One such challenge concerns disparate thermal expansion properties between the ceramic or CMC-based exhaust system components and the metallic structures to which they are typically attached. For example, in exhaust systems employing ceramic composite components attached to metallic components, the metallic components will typically expand to greater degrees than will the ceramic composite components when the systems reach elevated operating temperatures. The design of mechanisms used to attach ceramic composite components to metallic components should, therefore, take into account and accommodate the relative expansion and movement between the ceramic composite components and the metallic components. Other challenges concern interlaminar tensile stresses imposed on ceramic matrix composite components of exhaust systems, and the requirement to accommodate thermomechanical loads such that no delamination occurs within the ceramic component under normal operating conditions.

SUMMARY

An attachment system for an exhaust component is disclosed. In various embodiments, the attachment system includes a radial attachment flange of the exhaust component; and a radially inner ring having at least one of a radially outer surface configured for engagement with a radially inner surface of the radial attachment flange or a radially inner surface configured for engagement with a radially outer surface of the radial attachment flange.

In various embodiments, the radial ring is a radially inner ring and the radial attachment flange exhibits a coefficient of thermal expansion lower in value than the coefficient of thermal expansion of the radially inner ring. In various embodiments, the radially inner ring is configured to engage the radial attachment flange via a clearance fit between the radially outer surface of the radially inner ring and the radially inner surface of the radial attachment flange. In various embodiments, the radially inner ring is configured to apply a radially outwardly facing compressive load against the radially inner surface of the radial attachment flange. In various embodiments, the radially inner ring is configured to apply the radially outwardly facing compressive load against the radially inner surface of the radial attachment flange upon being exposed to a hot exhaust stream. In various embodiments, the radially inner ring includes a plurality of apertures configured to accommodate a plurality of bolts configured to secure the radial attachment flange to an attachment ring. In various embodiments, a radially outer ring having a radially inner surface is configured for engagement with a radially outer surface of the radial attachment flange.

In various embodiments, the radial ring is a radially outer ring and the radial attachment flange exhibits a coefficient of thermal expansion higher in value than the coefficient of thermal expansion of the radially outer ring. In various embodiments, a radially inner ring having a radially outer surface is configured for engagement with a radially inner surface of the radial attachment flange. In various embodiments, the radially inner ring is configured to apply a radially outwardly facing compressive load against the radially inner surface of the radial attachment flange upon being exposed to a hot exhaust stream. In various embodiments, the radially outer ring is configured to apply a radially inwardly facing compressive load against the radially outer surface of the radial attachment flange upon being exposed to elevated temperatures. In various embodiments, the radially outer ring includes a plurality of apertures configured to accommodate a plurality of bolts configured to secure the radial attachment flange to an attachment ring.

A method of attaching an exhaust component to an attachment ring is disclosed. In various embodiments, the method includes positioning at least one of a radially inner ring against a radially inner surface of a radial attachment flange of the exhaust component or a radially outer ring against a radially outer surface of the radial attachment flange of the exhaust component; and securing the radial attachment flange to the attachment ring via a plurality of bolts.

In various embodiments, the radial attachment flange exhibits a coefficient of thermal expansion lower in value than the coefficient of thermal expansion of the radially inner ring. In various embodiments, the radial attachment flange exhibits a coefficient of thermal expansion higher in value than the coefficient of thermal expansion of the radially outer ring. In various embodiments, the radially inner ring is configured to apply a radially outwardly facing compressive load against the radially inner surface of the radial attachment flange upon being exposed to a hot exhaust stream and the radially outer ring is configured to apply a radially inwardly facing compressive load against the radially outer surface of the radial attachment flange upon being exposed to the hot exhaust stream. In various embodiments, the method includes applying a coating to a surface of the radially outer ring, where the coating protects the parent material at elevated temperatures, and is configured to protect the radially outer ring from degradation such as from oxidation or oxidative erosion due to exposure to the hot exhaust stream.

An exhaust system for a gas turbine engine is disclosed. In various embodiments, the exhaust system includes an exhaust component having a radial attachment flange; an attachment ring configured to secure the exhaust component to the gas turbine engine; and a radial ring having at least one of a radially outer surface configured for engagement with a radially inner surface of the radial attachment flange or a radially inner surface configured for engagement with a radially outer surface of the radial attachment flange.

In various embodiments, the radial ring is a radially inner ring and the radial attachment flange exhibits a coefficient of thermal expansion lower in value than the coefficient of thermal expansion of the radially inner ring. In various embodiments, the radial ring is a radially outer ring and the radial attachment flange exhibits a coefficient of thermal expansion higher in value than the coefficient of thermal expansion of the radially outer ring.

The forgoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
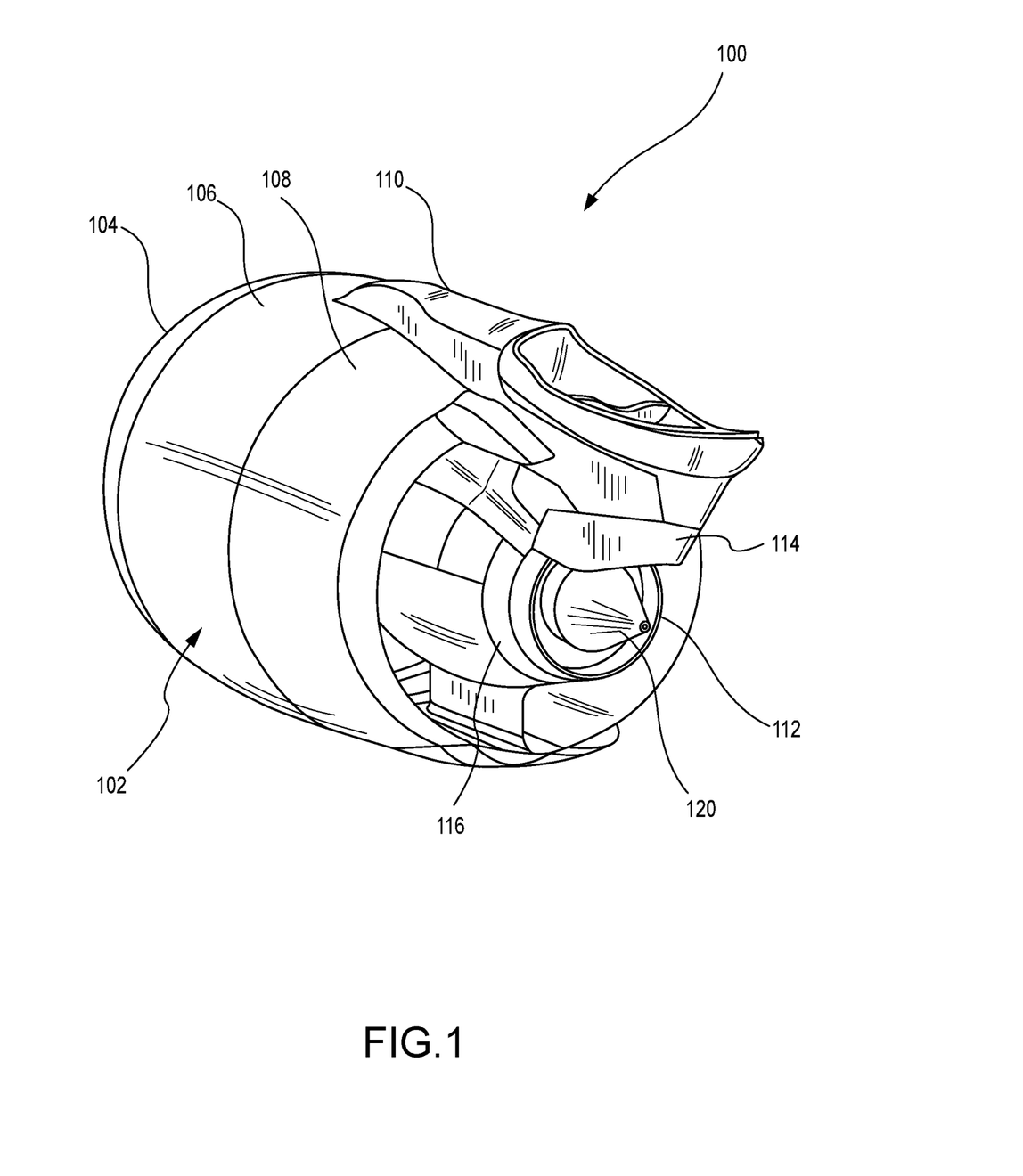
FIG. 1 is a perspective view of a gas turbine engine, in accordance with various embodiments.

Referring to FIG. 1, a gas turbine engine 100 is illustrated according to various embodiments. The gas turbine engine 100 includes a nacelle 102 that surrounds a core engine structure. In various embodiments, the nacelle 102 includes an inlet 104, a fan cowl 106 and a thrust reverser 108. The nacelle 102 may be coupled to a pylon 110, which may mount the nacelle 102 and the core engine structure to an aircraft wing or aircraft body. The nacelle 102 may further include an exhaust nozzle assembly including a nozzle 112 surrounding a center body 120 having a generally conical shape and, in various embodiments, the associated attachment structure. A high-temperature exhaust stream from the core engine structure exits the gas turbine engine 100 between the nozzle 112 and the center body 120. The nozzle 112 and the center body 120 may each be coupled to the core engine structure via an attachment system, which may include, for example, a center body attachment system or a nozzle attachment system. Broadly speaking, the various components described above comprising or relating to the nacelle 102, including the nozzle 112, the center body 120, the pylon fairing 114 and an aft core cowl 116 may be components comprising an exhaust system or a nacelle exhaust system. As described below with reference to FIGS. 2A and 2B, the attachment systems are applied to the center body 120 and to the nozzle 112, though the attachment system is equally applicable to other exhaust components of the gas turbine engine 100. Broadly speaking, the various exhaust components described above comprising or relating to the nacelle 102, including the nozzle 112 and the center body 120, the pylon fairing 114 and the aft core cowl 116, may be components comprising an exhaust system or a nacelle exhaust system.

Figure 2A:
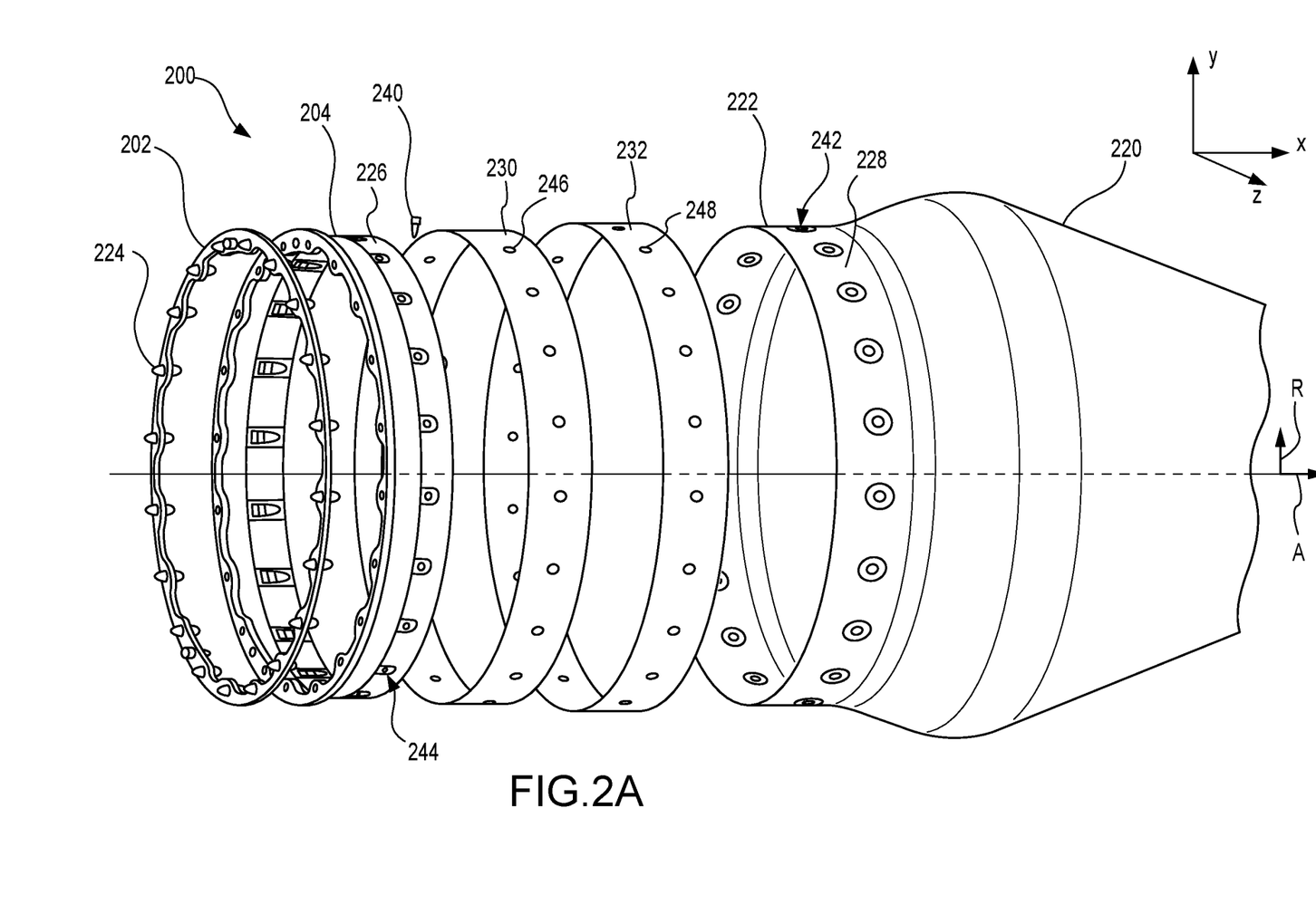
FIG. 2A is a perspective view of an exhaust center body attachment system, in accordance with various embodiments.

Referring now to FIG. 2A, a center body attachment system 200 is illustrated with respect to an XYZ coordinate system (with the X-direction pointing in an aft direction), in accordance with various embodiments. The center body attachment system 200 includes an engine flange 202, a center body attachment ring 204 and a center body 220, such as, for example, the center body 120 described above with reference to FIG. 1. More specifically, the center body attachment system 200 includes a center body radial attachment flange 222 of the center body 220 that is configured for attachment to the center body attachment ring 204. In various embodiments, the center body 220, including the center body radial attachment flange 222, is constructed of a ceramic matrix composite "CMC" material.

The center body attachment ring 204 may be coupled to the engine flange 202 via a plurality of attachment bolts 224. The center body attachment ring 204 may comprise an axially extending cylinder 226, constructed of a metallic material and disposed circumferentially about a central axis A that runs parallel with the X-direction; a radial direction R extends perpendicularly from the central axis A and lies in the YZ plane. Typically, the axially extending cylinder 226 defines an outer diameter selected to fit radially inward of the center body radial attachment flange 222, which also comprises an axially extending cylinder 228. As described in further detail below, in various embodiments, a radially inner ring 230 (or a radial ring) is configured to fit between a radially outer surface of the axially extending cylinder 226 of the center body attachment ring 204 and a radially inner surface of the axially extending cylinder 228 of the center body radial attachment flange 222. Similarly, in various embodiments, a radially outer ring 232 (or a radial ring) is configured to fit radially outside of a radially outer surface of the axially extending cylinder 228 of the center body radial attachment flange 222.

Still referring to FIG. 2A, during assembly, the radially inner ring 230 is slid over the radially outer surface of the axially extending cylinder 226 of the center body attachment ring 204 and the resulting assembly of the radially inner ring 230 and the center body attachment ring 204 are then slid into the center body radial attachment flange 222. The radially inner ring 230, the center body attachment ring 204 and the center body radial attachment flange 222 may then be secured together via a plurality of bolts 240 configured to extend radially through each of the components. Similarly, in various embodiments, during assembly, the radially outer ring 232 is slid over the radially outer surface of the center body radial attachment flange 222, followed by each of the radially inner ring 230, the center body attachment ring 204, the center body radial attachment flange 222 and the radially outer ring 232 being secured together via the plurality of bolts 240. Each of the plurality of bolts 240 is configured for insertion in a radial direction through a first plurality of apertures 242 extending through the center body radial attachment flange 222, a second plurality of apertures 244 extending through the center body attachment ring 204, a third plurality of apertures 246 extending through the radially inner ring 230 and a fourth plurality of apertures 248 extending through the radially outer ring 232.

The center body attachment system 200 may be subject to operating environments that experience a wide range of temperatures, such as, for example, from 0° F. to 1,400° F. (−20° C. to 760° C.). Such temperatures are typical, for example, of a hot exhaust stream exiting a gas turbine engine in the proximity of the center body attachment system 200. Due to disparities in the materials used to construct the various components of the center body attachment system 200, the center body attachment ring 204 may expand more than the center body radial attachment flange 222 in response to the same increase in temperature. The center body attachment system 200 may thus be configured to decrease loading on the center body radial attachment flange 222 that could cause the center body 220 to crack or otherwise be damaged in response to a change in temperature.

For example, in various embodiments, the radially inner ring 230 may be constructed of a material that exhibits a higher coefficient of thermal expansion than does the material used to construct the center body 220 and, more particularly, the center body radial attachment flange 222. The higher coefficient of thermal expansion will enable the radially inner ring 230 to expand in a radial direction at a rate greater than that of the center body radial attachment flange 222, thereby resulting in the radially inner ring 230 placing a radially outwardly facing compressive load against the radially inner surface of the center body radial attachment flange 222. In various embodiments, the radially inner ring 230 is configured (e.g., sized) to provide a clearance fit between the radially outer surface of the radially inner ring 230 and the radially inner surface of the center body radial attachment flange 222. The clearance fit ensures the compressive load above described will be applied upon heating of the center body attachment system 200.

Similarly, in various embodiments, the radially outer ring 232 may be constructed of a material that exhibits a lower coefficient of thermal expansion than does the material used to construct the center body 220 and, more particularly, the center body radial attachment flange 222. The lower coefficient of thermal expansion will enable the radially outer ring 232 to expand in a radial direction at a rate lesser than that of the center body radial attachment flange 222, thereby resulting in the radially outer ring 232 placing a radially inwardly facing compressive load against the radially outer surface of the center body radial attachment flange 222. In various embodiments, the radially outer ring 232 is configured (e.g., sized) to provide a clearance fit between the radially inner surface of the radially outer ring 232 and the radially outer surface of the center body radial attachment flange 222. The clearance fit ensures the compressive load above described will be applied upon heating of the center body attachment system 200.

In various embodiments, the materials used to construct the center body attachment system 200 may be selected to provide or enhance the compressive loadings above described. For example, the material used to construct the radially inner ring 230 may be constructed using an austenitic nickel-chromium-based alloy such as Inconel®, which is available from Special Metals Corporation of New Hartford, N.Y., USA. In various embodiments, the material may comprise Inconel® MA6000, which exhibits a greater coefficient of thermal expansion than do the ceramic matrix composite (CMC) materials typically used to construct the center body attachment ring 204. In contrast, the material used to construct the radially outer ring 232 may be constructed using a silicon carbide-silicon carbide, carbon-silicon carbide, or carbon-carbon composite material, or other similar materials or composite materials known to those skilled in the art, which exhibit a lower coefficient of thermal expansion than do the CMC materials used to construct the exhaust component including the attachment flange. In various embodiments, the silicon carbide-silicon carbide material may comprise a silicon carbide fiber embedded in a matrix comprising of silicon carbide. In various embodiments, the carbon-carbon material may comprise a carbon fiber reinforcement embedded in a matrix comprising of graphite. In various embodiments, a coating 337 may be applied to all surfaces of the silicon carbide-silicon carbide, carbon-silicon carbide or the carbon-carbon material used to construct the radially outer ring 232 in order to protect it from degradation, such as, for example, oxidation or oxidative erosion of the parent material due to the hot exhaust stream.

In various embodiments, the center body attachment ring 204 may also be constructed using an austenitic nickel-chromium-based alloy such as Inconel®. For example, the center body attachment ring 204 may be constructed using a variety of nickel and chromium based alloys, such as Inconel® MA754, an oxide dispersion strengthened nickel-chromium super alloy, such as that sold under the mark Rene 41, a nickel-cobalt high temperature alloy, such as that sold under the mark Haynes® 244, a nickel-cobalt alloy manufactured by Haynes International, Inc.; or the material sold under the mark Haynes® 282, which is a wrought gamma-prime strengthened superalloy manufactured by Haynes International, Inc.

Figure 2B:
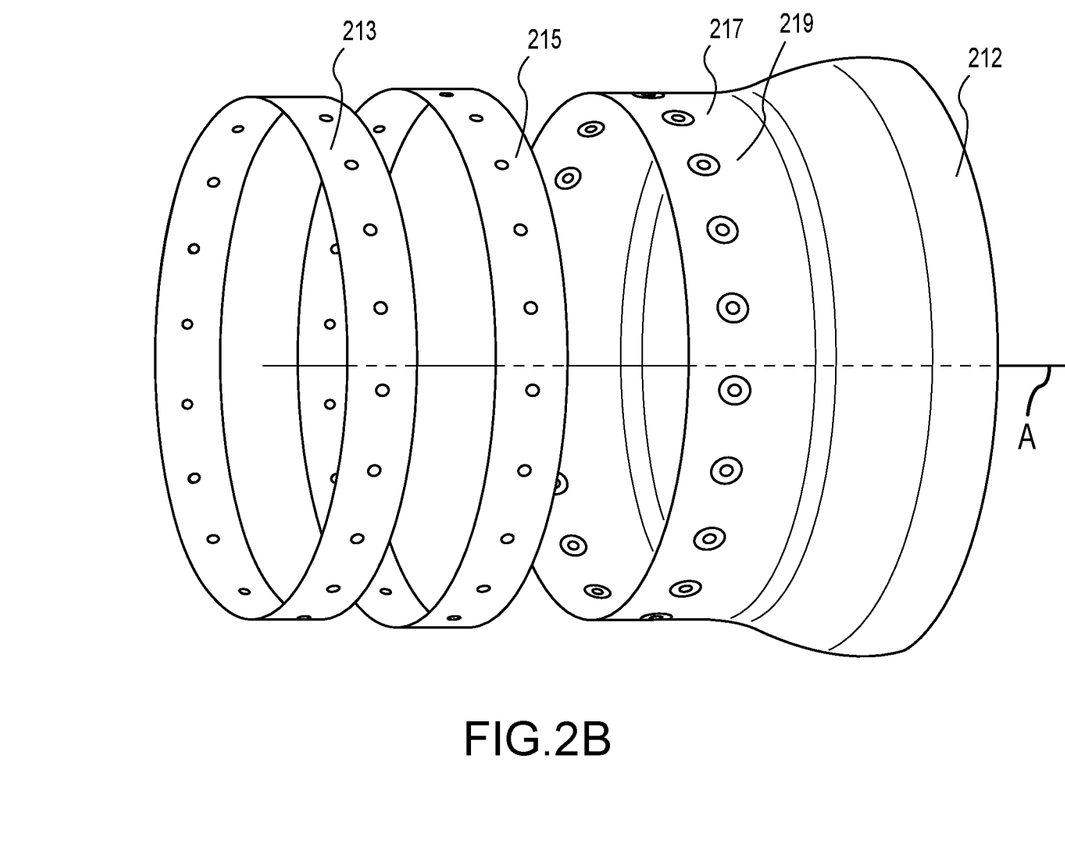
FIG. 2B is a perspective view of an exhaust nozzle attachment system, in accordance with various embodiments.

Referring now to FIG. 2B a nozzle attachment system, similar to the center body attachment system 200 described above, is illustrated in accordance with various embodiments. The nozzle attachment system is configured to attach a nozzle 212 to an attachment ring, similar to the center body attachment ring 204 described above. In various embodiments, the nozzle attachment system includes a radially inner ring 213 (or a radial ring) configured to fit within a radially inner surface of a nozzle radial attachment flange 217, which comprises an axially extending cylinder 219 portion of the nozzle 212, and a radially outer ring 215 (or a radial ring) configured to fit a radially outer surface of the axially extending cylinder 219. Similar to the discussion above, the radially inner ring 213 may be constructed of a material that exhibits a higher coefficient of thermal expansion than does the material used to construct the nozzle 212 and, more particularly, the nozzle radial attachment flange 217. The higher coefficient of thermal expansion will enable the radially inner ring 213 to expand in a radial direction at a rate greater than that of the nozzle radial attachment flange 217, thereby resulting in the radially inner ring 213 placing a radially outwardly facing compressive load against the radially inner surface of the nozzle radial attachment flange 217. In various embodiments, the radially inner ring 213 is configured (e.g., sized) to provide a clearance fit between the radially outer surface of the radially inner ring 213 and the radially inner surface of the nozzle radial attachment flange 217. The clearance fit ensures the compressive load above described will be applied upon heating of the nozzle 212 or the nozzle attachment system. Similarly, in various embodiments, the radially outer ring 215 may be constructed of a material that exhibits a lower coefficient of thermal expansion than does the material used to construct the nozzle 212 and, more particularly, the nozzle radial attachment flange 217. The lower coefficient of thermal expansion will enable the radially outer ring 215 to expand in a radial direction at a rate lesser than that of the nozzle radial attachment flange 217, thereby resulting in the radially outer ring 215 placing a radially inwardly facing compressive load against the radially outer surface of the nozzle radial attachment flange 217. In various embodiments, the radially outer ring 215 is configured (e.g., sized) to provide a clearance fit between the radially inner surface of the radially outer ring 215 and the radially outer surface of the nozzle radial attachment flange 217. The clearance fit ensures the compressive load above described will be applied upon heating of the nozzle or the nozzle attachment system.

Figure 3A:
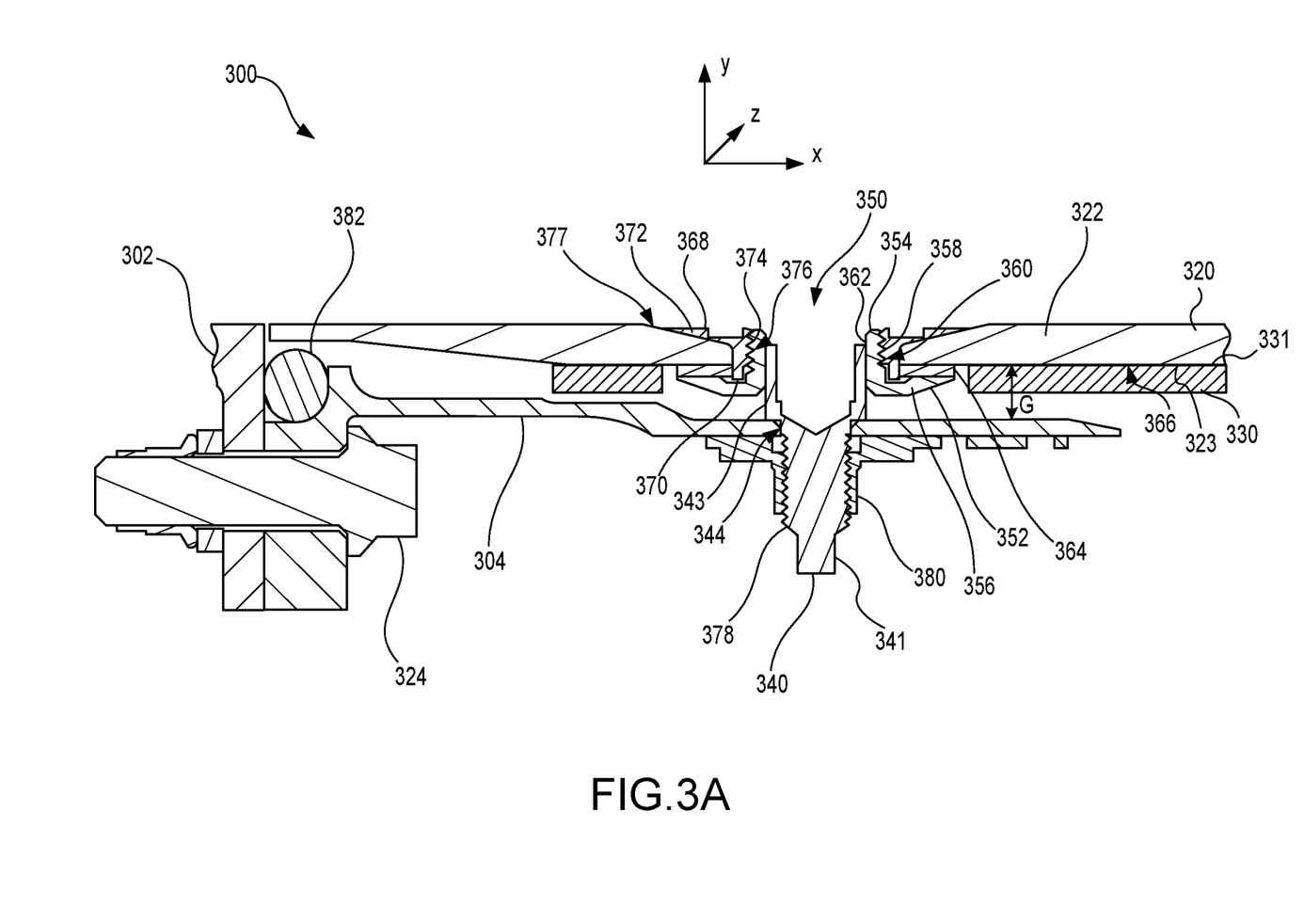
FIG. 3A is a cross section view of a portion of a center body attachment system in accordance with various embodiments.
Figure 3B:
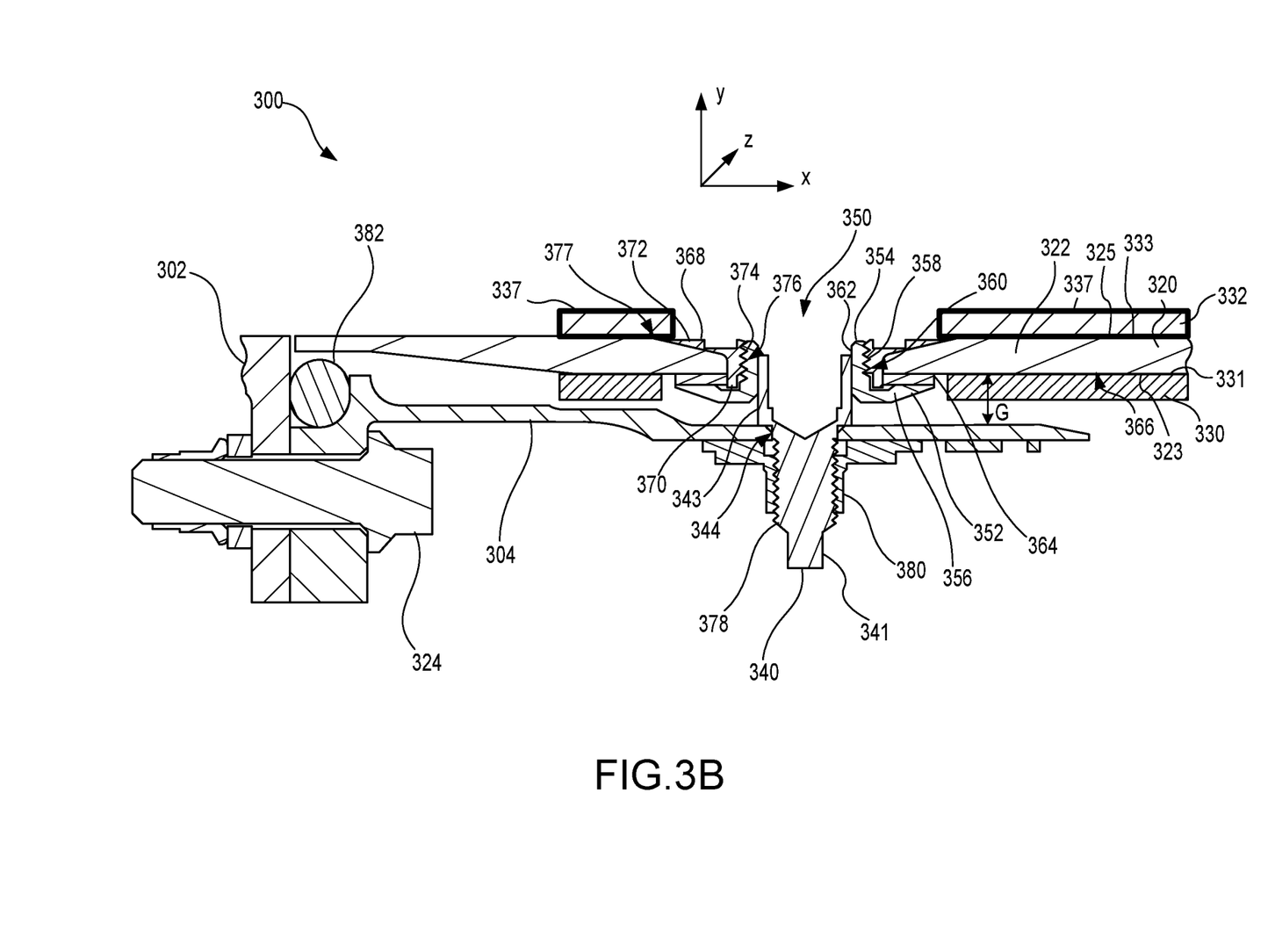
FIG. 3B is a cross section view of a portion of a center body attachment system in accordance with various embodiments.
Figure 3C:
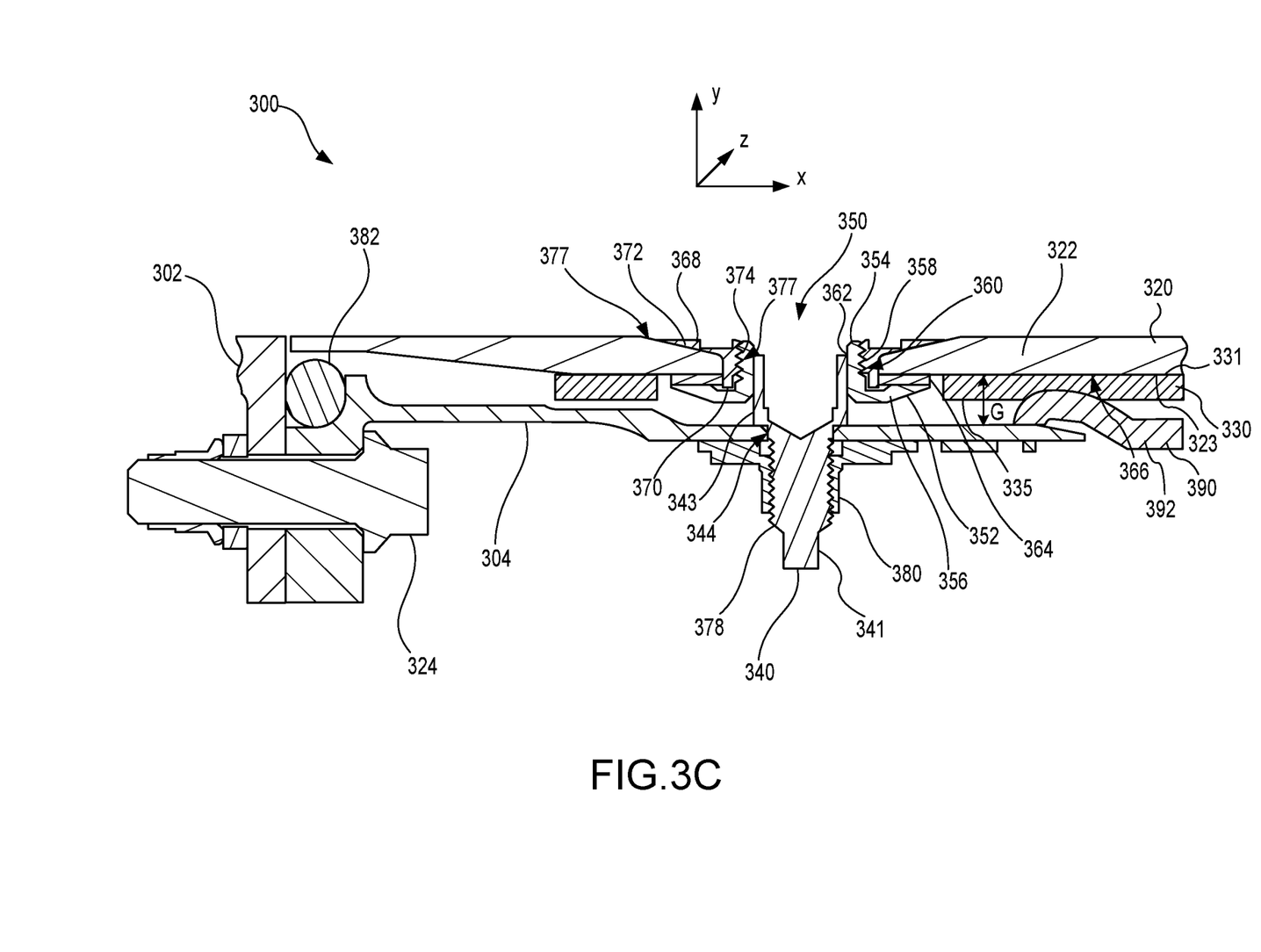
FIG. 3C is a cross section view of a portion of a center body attachment system in accordance with various embodiments.

Referring now to FIGS. 3A, 3B and 3C, a cross section of a portion of a center body attachment system 300, similar to the center body attachment system 200 described with reference to FIG. 2A, is illustrated according to various embodiments. While the disclosure herein focuses on the center body attachment system 300, similar constructions may be employed for the nozzle attachment system or other attachment systems subject to the high temperature exhaust stream of a nacelle. The center body attachment system 300 includes a center body attachment ring 304 configured for coupling to an engine flange 302 via a plurality of attachment bolts 324. A center body radial attachment flange 322 of a center body 320 may be located around the center body attachment ring 304 and separated from the center body attachment ring 304 by a gap G. The center body radial attachment flange 322 may comprise an aperture 350. A bushing nut 352 may be located at least partially within the aperture 350. The bushing nut 352 may comprise a cylinder 354 and a collar 356 extending from the cylinder 354. The cylinder 354 may comprise threads 358 on an outer surface 360 of the cylinder 354. The cylinder 354 may have a smooth inner surface 362. A washer 364 may be located between the collar 356 and a radially inner surface 366 of the center body radial attachment flange 322. An insert housing 368 may be located at least partially within the aperture 350. The insert housing 368 may comprise a cylinder 370 and a collar 372 extending from the cylinder 370. The cylinder 370 may comprise threads 374 on an inner surface 376 of the cylinder 370. The insert housing 368 may be threaded onto the bushing nut 352. The insert housing 368 may be tightened until the collar 372 of the insert housing 368 contacts a countersunk outer surface 377 of the center body radial attachment flange 322, and the collar 356 of the bushing nut 352 clamps the washer 364 between the collar 356 and the radially inner surface 366 of the center body radial attachment flange 322. The bushing nut 352 and the insert housing 368 may be formed of a metallic material. The aperture 350 is tapered and the collar 356 of the bushing nut 352 is similarly tapered. The geometry of this taper is selected to ensure that as the bushing nut 352 and the insert housing 368 thermally expand, both radially and axially, both bushing nut 352 and the insert housing 368 maintain a tight grip against the aperture 350.

The center body attachment ring 304 and the center body radial attachment flange 322 may be secured together via a plurality of bolts 340 configured to extend radially through each of the components. By way of example, a bolt 341 of the plurality of bolts 340 may be inserted through the bushing nut 352. A threaded shaft 378 of the bolt 341 may be inserted through an aperture 344 in the center body attachment ring 304. The threaded shaft 378 may be threaded into a nut-plate 380. The bolt 341 may be tightened until a head 343 of the bolt 341 contacts the center body attachment ring 304, clamping the bolt 341 and the nut-plate 380 to the center body attachment ring 304. The outer surface of the head 343 of the bolt 341 may be cylindrical, or circular in cross-section. The head 343 may be configured to translate within the bushing nut 352 with a close sliding fit. To this end, the head 343 may have a diameter of its cylindrical portion that closely matches, but is slightly smaller than a diameter of the smooth inner surface 362 of the cylinder 354 of the bushing nut 352. This sliding fit allows relative sliding in a radial direction R (e.g., in the YZ plane and perpendicular to the X axis) but no relative movement in the axial or circumferential directions. Loads exerted on the center body 320 may thus be effectively transferred to the bolt 341 and then to the center body attachment ring 304 and the engine. A seal 382 may be disposed about a radially outward surface (along the y-axis) of the center body attachment ring 304 between the center body attachment ring 304 and the engine flange 302. In various embodiments, the seal 382 prevents exhaust gases from escaping between the juncture of the engine flange 302 and the center body radial attachment flange 322. In various embodiments, the seal 382 comprises a curved piece of mechanically elastic material, such as, for example, an elastic metal. In various embodiments, the seal 382 comprises a ceramic material comprising or including a silica-based material.

Referring to FIG. 3A, the center body attachment system 300 includes a radially inner ring 330, similar to the radially inner ring 230 described above with reference to FIG. 2. The radially inner ring 330 is disposed in the region of the gap G between the center body radial attachment flange 322 and the center body attachment ring 304. As described previously, in various embodiments, the radially inner ring 330 is sized to provide a clearance fit between a radially outer surface 331 of the radially inner ring 330 and a radially inner surface 323 of the center body radial attachment flange 322. The clearance fit helps ensure the compressive load above described will be applied in a radially outward direction against radially inner surface 323 of the center body radial attachment flange 322 upon heating of the center body attachment system 300.

Referring to FIG. 3B, the center body attachment system 300 may also include a radially outer ring 332, similar to the radially outer ring 232 described above with reference to FIG. 2. The radially outer ring 332 is disposed radially outward of the center body radial attachment flange 322 and the center body attachment ring 304. As described previously, in various embodiments, the radially outer ring 332 is sized to provide a clearance fit between a radially inner surface 333 of the radially outer ring 332 and a radially outer surface 325 of the center body radial attachment flange 322. The clearance fit helps ensure the compressive load above described will be applied in a radially inward direction against radially outer surface 325 of the center body radial attachment flange 322 upon heating of the center body attachment system 300. Referring to FIG. 3C, the center body attachment system may also include a seal 390 disposed radially inward of the radially inner ring 330. In various embodiments, the seal 390 comprises a turkey feather seal 392 disposed circumferentially about a radially inner surface 335 of the radially inner ring 330. In various embodiments, the turkey feather seal 392 may be disposed in a segmented manner against the radially inner surface 335 of the radially inner ring 330.

Figure 4:
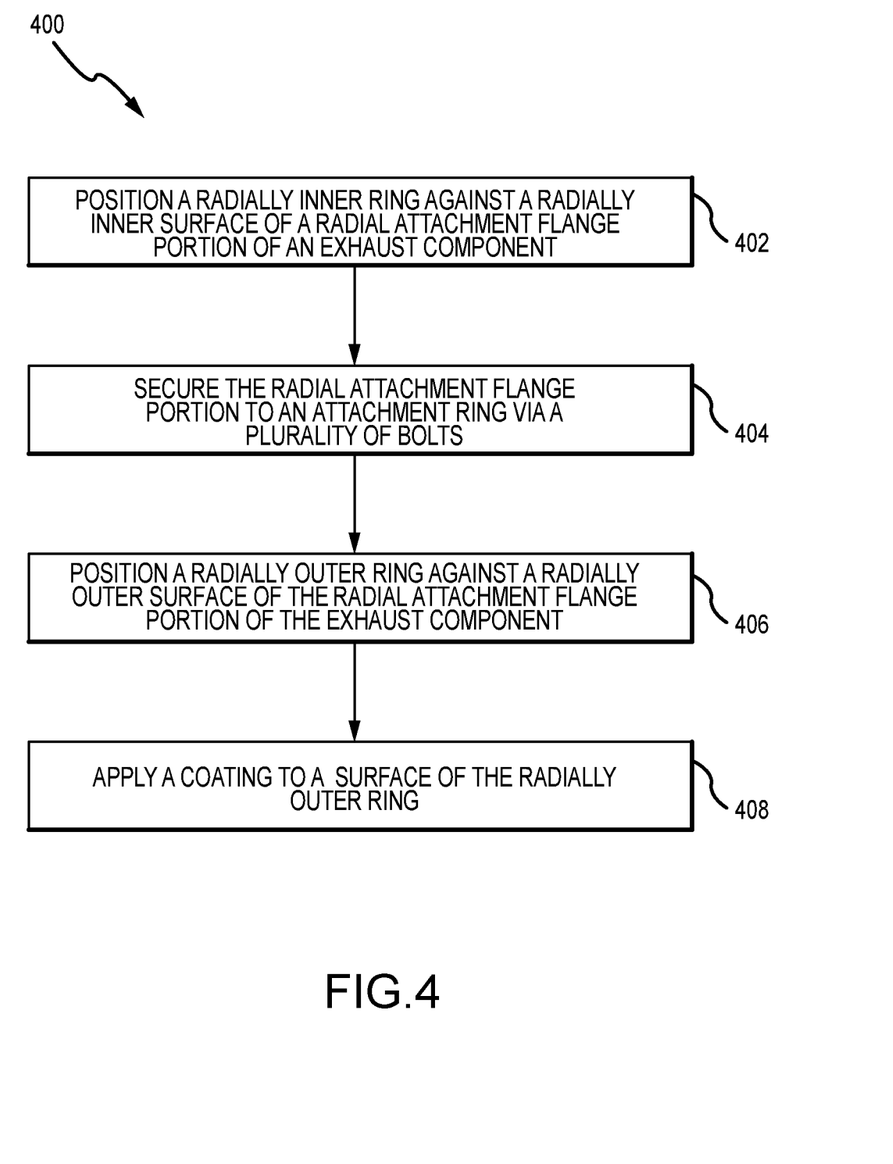
FIG. 4 describes a method of attaching an exhaust component to an attachment ring, in accordance with various embodiments.

Referring now to FIG. 4, a method 400 of attaching an exhaust component, such as, for example, a center body or a nozzle, to an attachment ring is described as comprising the following steps. In various embodiments, a first step 402 includes positioning a radially inner ring against a radially inner surface of a radial attachment flange of the exhaust component. A second step 404 includes securing the radial attachment flange to the attachment ring via a plurality of bolts. The radial attachment flange exhibits a coefficient of thermal expansion lower in value than the coefficient of thermal expansion of the radially inner ring. In various embodiments, a third step 406 includes positioning a radially outer ring against a radially outer surface of the radial attachment flange of the exhaust component. The radial attachment flange exhibits a coefficient of thermal expansion higher in value than the coefficient of thermal expansion of the radially outer ring. In various embodiments, a fourth step 408 includes applying a coating to all surfaces of the radially outer ring, the coating configured to prevent oxidation or oxidative erosion of the parent material due to the hot exhaust stream.

The radially inner ring and the radially outer ring described above provide several benefits to an attachment of an exhaust component to an attachment ring. One benefit includes improved interlaminar shear properties of the CMC material comprising the exhaust component and, in particular, the radial attachment flange of the exhaust component. CMC materials may exhibit, in various embodiments, low interlaminar shear properties due to voids or disbonds between plies. The radial compression of the radial attachment flange afforded by one or both of the radially inner and outer rings may serve to improve in-plane strengths and the interlaminar shear properties. In addition, the radially outer ring urges the radial attachment flange into a state of hoop compression, which may change potential failure modes proximate each of the plurality of apertures from pure bearing to bearing bypass stress states. In addition, the hoop compression may close or alleviate stress concentrations at cracks near the apertures that might otherwise be considered weak links. Similarly, the radially inner ring urges the radial attachment flange into a state of hoop tension, which may also change potential failure modes proximate each of the plurality of apertures from pure bearing to bearing bypass stress states. In addition, the hoop tension serves to shift locations of peak tension proximate the apertures and may relieve the effect of the tension caused by an applied bearing load or out of plane Poisson effects.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. An attachment system for an exhaust component, comprising:
   a radial attachment flange of the exhaust component;
   a radial ring having a radially inner surface configured to contact a radially outer surface of the radial attachment flange in response to heating of the attachment system; and
   a radially inner ring having a radially outer surface configured for engagement with a radially inner surface of the radial attachment flange;
   wherein the radial attachment flange exhibits a coefficient of thermal expansion lower in value than the coefficient of thermal expansion of the radially inner ring; and
   wherein the radial ring is a radially outer ring and the radial attachment flange exhibits a coefficient of thermal expansion higher in value than the coefficient of thermal expansion of the radially outer ring.

2. The attachment system of claim 1, wherein the radially inner ring is configured to engage the radial attachment flange via a clearance fit between the radially outer surface of the radially inner ring and the radially inner surface of the radial attachment flange.

3. The attachment system of claim 2, wherein the radially inner ring is configured to apply a radially outwardly facing compressive load against the radially inner surface of the radial attachment flange.

4. The attachment system of claim 3, wherein the radially inner ring is configured to apply the radially outwardly facing compressive load against the radially inner surface of the radial attachment flange upon being exposed to a hot exhaust stream.

5. The attachment system of claim 4, wherein the radially inner ring includes a plurality of apertures configured to accommodate a plurality of bolts configured to secure the radial attachment flange to an attachment ring.

6. The attachment system of claim 1, wherein the radially inner ring is configured to apply a radially outwardly facing compressive load against the radially inner surface of the radial attachment flange upon being exposed to a hot exhaust stream.

7. The attachment system of claim 6, wherein the radially outer ring is configured to apply a radially inwardly facing compressive load against the radially outer surface of the radial attachment flange upon being exposed to the hot exhaust stream.

8. The attachment system of claim 7, wherein the radially outer ring includes a plurality of apertures configured to accommodate a plurality of bolts configured to secure the radial attachment flange to an attachment ring.

9. A method of attaching an exhaust component to an attachment ring, comprising:
   positioning a radially outer ring around a radially outer surface of a radial attachment flange of the exhaust component;
   securing the radial attachment flange to the attachment ring via a plurality of bolts; and
   positioning a radially inner ring against a radially inner surface of the radial attachment flange of the exhaust component;
   wherein the radial attachment flange exhibits a coefficient of thermal expansion lower in value than the coefficient of thermal expansion of the radially inner ring;
   wherein the radial attachment flange exhibits a coefficient of thermal expansion higher in value than the coefficient of thermal expansion of the radially outer ring; and
   a radially inner surface of the radially outer ring is configured to contact the radially outer surface in response to heating of the radial attachment flange and the radially outer ring,
   wherein the radial attachment flange exhibits a coefficient of thermal expansion lower in value than the coefficient of thermal expansion of the radially inner ring.

10. The method of claim 9, wherein the radially inner ring is configured to apply a radially outwardly facing compressive load against the radially inner surface of the radial attachment flange upon being exposed to a hot exhaust stream and the radially outer ring is configured to apply a radially inwardly facing compressive load against the radially outer surface of the radial attachment flange upon being exposed to the hot exhaust stream.

11. The method of claim 9, further comprising applying a coating to a surface of the radially outer ring, the coating configured to prevent degradation.

12. An exhaust system for a gas turbine engine, comprising:
   an exhaust component having a radial attachment flange;
   an attachment ring configured to secure the exhaust component to the gas turbine engine; and
   a radial ring having a radially inner surface configured to contact a radially outer surface of the radial attachment flange in response to heating of the exhaust system;
   a radially inner ring having a radially outer surface configured for engagement with a radially inner surface of the radial attachment flange;
   wherein the radial attachment flange exhibits a coefficient of thermal expansion lower in value than the coefficient of thermal expansion of the radially inner ring; and
   wherein the radial ring is a radially outer ring and the radial attachment flange exhibits a coefficient of thermal expansion higher in value than the coefficient of thermal expansion of the radially outer ring.

* * * * *